(12) United States Patent
Wang et al.

(10) Patent No.: US 11,750,471 B2
(45) Date of Patent: Sep. 5, 2023

(54) METHOD AND APPARATUS FOR DETERMINING RESOURCE CONFIGURATION OF CLOUD SERVICE SYSTEM

(71) Applicant: Siemens Aktiengesellschaft, Munich (DE)

(72) Inventors: Qi Wang, Wuhan (CN); Shuangquan Gui, Shuangliu (CN); Hong Mu, Sichuan (CN); He Yu, Wuxi (CN); Zhou Yuan, Wuhan (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/001,900

(22) PCT Filed: Jun. 16, 2020

(86) PCT No.: PCT/CN2020/096398
§ 371 (c)(1),
(2) Date: Dec. 15, 2022

(87) PCT Pub. No.: WO2021/253239
PCT Pub. Date: Dec. 23, 2021

(65) Prior Publication Data
US 2023/0188432 A1 Jun. 15, 2023

(51) Int. Cl.
*H04L 41/5009* (2022.01)
*H04L 41/14* (2022.01)
*H04L 41/0806* (2022.01)

(52) U.S. Cl.
CPC ...... *H04L 41/5009* (2013.01); *H04L 41/0806* (2013.01); *H04L 41/145* (2013.01)

(58) Field of Classification Search
CPC ............ H04L 41/5009; H04L 41/0806; H04L 41/145; H04L 41/0233; H04L 41/085; H04L 41/12; H04L 41/14; H04Q 3/0079
See application file for complete search history.

(56) References Cited

U.S. PATENT DOCUMENTS

| | | | |
|---|---|---|---|
| 2016/0357584 A1* | 12/2016 | Cao | .......................... G06F 9/455 |
| 2020/0089533 A1* | 3/2020 | Guha | .................. G06F 11/3006 |

(Continued)

FOREIGN PATENT DOCUMENTS

| | | | | |
|---|---|---|---|---|
| CN | 103986669 | | 8/2014 | ........... H04L 12/917 |
| CN | 106845746 | | 6/2017 | ............. G06Q 10/06 |

(Continued)

OTHER PUBLICATIONS

Search Report for International Application No. PCT/CN2020/096398, 6 pages, dated Mar. 16, 2021.

(Continued)

*Primary Examiner* — Joe Chacko
(74) *Attorney, Agent, or Firm* — Slayden Grubert Beard PLLC

(57) ABSTRACT

Various embodiments include methods for determining a resource configuration of a cloud service system using a system simulation tool with a model library. This may include: obtaining a model required for each service; obtaining a resource limit setting of each required model; creating a service workflow among the models to obtain a system simulation model, indicating the interaction workflow among the models and the sequence of model execution in a single service; using training data to train a service performance model of each service, wherein the training data comprises test data collected from the cloud service system in a testing environment, and the service performance model defines a resource consumption of a single request running on a service in the system simulation model;

(Continued)

performing system simulation with a given resource configuration set and the resource limit settings, to obtain a system performance KPI; and determining a resource configuration with the best KPI.

19 Claims, 13 Drawing Sheets

(56) References Cited

U.S. PATENT DOCUMENTS

2021/0089335 A1   3/2021  Wang
2021/0182106 A1*  6/2021  Wang ..................... G06N 3/08

FOREIGN PATENT DOCUMENTS

| CN | 109412829 | 3/2019 | ............. H04L 12/24 |
| CN | 111194539 | 5/2020 | ............... H04L 9/08 |

OTHER PUBLICATIONS

Zhu, Mingfa et al: "Elastic scaling method of cloud platform resources based on benefit analysis"; Journal of JIlin Normal University; vol. 37, No. 4, dated Nov. 1, 2016.

\* cited by examiner

METHOD AND APPARATUS FOR DETERMINING RESOURCE CONFIGURATION OF CLOUD SERVICE SYSTEM

CROSS-REFERENCE TO RELATED APPLICATIONS

This application is a U.S. National Stage Application of International Application No. PCT/CN2020/096398 filed Jun. 16, 2020, which designates the United States of America, the contents of which are hereby incorporated by reference in their entirety.

TECHNICAL FIELD

The present disclosure in general relates to the field of cloud services. Various embodiments of the teachings herein may include methods and/or apparatuses for determining the resource configuration of a cloud service system.

BACKGROUND

With the development of big data and the Internet of Things, it has become a trend to provide services on the cloud. For example, AWS, the cloud provider of Alibaba Cloud, has provided a range of diverse cloud services, which will help business providers or service providers run their business systems or service systems on the cloud, covering the entire life cycle of the business systems or service systems, including the development and operation of the business systems or service systems. In this context, business providers or service providers need to know how to make full use of cloud services with optimal resource configuration, especially for those business systems or service systems that require a large amount of cloud services and infrastructure resources. The performance modeling approach is a method widely used in system evaluation in different fields and has been applied to resource configuration optimization of cloud service systems.

However, in the performance modeling approach, performance modeling and simulation requires in-depth knowledge of computer systems and mathematical or statistical skills. Moreover, the creation of performance models is time consuming and error prone, especially for complex systems with interacting services, due to the many parameters and conditions that need to be considered in performance models. In addition, most performance modeling methods can only be applied to resource configuration optimization of steady-state systems, but not dynamic or elastic systems.

SUMMARY

In view of the above, the present disclosure describes methods and apparatus for determining the resource configuration of a cloud service system by use of a system simulation tool. With the methods and/or apparatuses taught herein, the process of determining the resource configuration of a cloud service system can be made simpler and easier.

As an example, some embodiments include a method for determining a resource configuration of a cloud service system by use of a system simulation tool comprising a model library, which comprises a basic hardware model set, a cloud infrastructure model set and a basic software model set, and the method comprises: obtaining a model required for each service of a cloud service system from the model library; obtaining a resource limit setting for each required model; creating a service workflow among the obtained models to obtain a system simulation model of the cloud service system, wherein the service workflow indicates an interaction workflow among the models and a model execution sequence within a single service; using training data to train a service performance model of each service in the system simulation model, wherein the training data comprises part or all of the test data collected from the cloud service system in a testing environment, and the service performance model defines a resource consumption of a single request running on a service in the system simulation model; using the service performance model and the system simulation model to perform system simulation with a given resource configuration set and the resource limit settings to obtain a system performance KPI; and determining a resource configuration with the best system performance KPI in the resource configuration set as the resource configuration of the cloud service system (30).

In some embodiments, through a system simulation tool comprising a model library, a service performance model training module and a discrete event simulation engine, standardized models in the model library are used to create a system simulation model, the service performance training module is used to automatically train the test data collected from a cloud service system in a testing environment to obtain model parameters of the system simulation model, and the system simulation model obtained in this way is used for model simulation to determine the best resource configuration, so that the process of determining the resource configuration of a cloud service system can be made simpler and easier.

In some embodiments, the cloud service system comprises an interactive elastic cloud service system, and the cloud infrastructure model set may comprise an auto-scaling service model. With this method, the resource configuration of an interactive elastic cloud service system can be determined.

In some embodiments, the method further comprises: obtaining a target performance KPI of the system simulation model; and removing resource configurations, which have a system performance KPI exceeding the target performance KPI, from the resource configuration set; and determining a resource configuration that has the best system performance KPI in the resource configuration set as the resource configuration of the cloud service system comprises: determining a resource configuration, which has the best system performance KPI in the resource configuration set after the removal processing, to be the resource configuration of the cloud service system. With this method, by use of target performance KPIs in different application scenarios or for different application requirements, the determined resource configuration can be adapted to various application scenarios or application requirements of the cloud service system.

In some embodiments, the system simulation tool may have a visualized operation interface, and the visualized operation interface comprises a model display area. Obtaining a required model for each service of the cloud service system from the model library may comprise: obtaining a selected model in response to a model selection operation on the model library in the model display area. In these embodiments, a model required for each service of a cloud service system can be obtained through a model selection operation, which can make the system simulation process more intuitive and simpler.

In some embodiments, the system simulation tool has a visualized operation interface, and the visualized operation interface comprises a model obtaining area. Obtaining a model required for each service of the cloud service system from the model library may comprise: obtaining a model required for each service from the model library in response to inputting of service identification information or service configuration information of each service of the cloud service system in the model obtaining area. In these embodiments, the service identification information or service configuration information of each service is input, and a background module of the system simulation tool can automatically obtain the model required for each service of the cloud service system without the need for manual selection by the user, which can greatly reduce the workload and error rate in the model obtaining process, thereby improving the accuracy and efficiency of system simulation.

In some embodiments, the visualized operation interface may further comprise a model editing area. The method may also comprise: presenting each model obtained in the model editing area. Creating a service workflow among the obtained models to obtain a system simulation model of the cloud service system may comprise: creating a service workflow among the models in response to a linking operation between corresponding endpoints of the obtained models in the model editing area. In these embodiments, the system simulation process can be made more intuitive and simplified by performing the linking operation between the endpoints of the models in the service in the model editing area and automatically creating the service workflow between different models by a background module.

In some embodiments, creating a service workflow among the acquired models to obtain a system simulation model of the cloud service system may comprise: creating a service workflow among the obtained models according to operation process information of each service to obtain a system simulation model of the cloud service system. In these embodiments, the service workflow among the models is automatically created by a background module of the system simulation tool according to the operation process information of each service, without the need for manual linking, which can greatly reduce the workload and error rate in the process of creating service workflows, thereby improving the accuracy and efficiency of system simulation.

In some embodiments, the model library further comprises a service model set, and the service model set comprises standard service workflow models, standard service performance models and/or standard cloud service performance models, and the method further comprises: obtaining a corresponding standard service workflow model, standard service performance model and/or standard cloud service performance model from the service model set in response to a standard service being comprised in each service of the cloud service system. In these embodiments, by saving the service workflow models and service performance models of various common services in the model library, when the cloud service system to be simulated comprises a common service, the corresponding standard service workflow model and service performance model can be directly obtained from the service model set, without the need to re-simulate the model for the service, thereby simplifying the system simulation process and improving the accuracy and efficiency of system simulation.

In some embodiments, the test data comprises verification data, and, before using the service performance model and the system simulation model to perform system simulation with a given resource configuration set to obtain the system performance KPI, the method further comprises: using the verification data to perform model verification, wherein, when the model verification fails, the process of creating a system simulation model and a service performance model is executed again. In these embodiments, the model simulation accuracy of the system simulation model can be ensured by using test data to verify the system simulation model.

In some embodiments, the method may further comprise: performing a performance test on the determined resource configuration. In these embodiments, it can be ensured that the determined resource configuration has the expected performance, thereby preventing an inappropriate resource configuration from being provided to the cloud service system in the production environment to execute the production plan.

As another example, some embodiments include an apparatus for determining a resource configuration of a cloud service system applied to a system simulation tool, the system simulation tool comprises a model library, which comprises a basic hardware model set, a cloud infrastructure model set and a basic software model set, and the apparatus comprises: a model obtaining unit, configured to obtain a model required for each service of a cloud service system from the model library; a resource limit setting obtaining unit, configured to obtain a resource limit setting for each required model; a service workflow creating unit, configured to create a service workflow among the obtained models to obtain a system simulation model of the cloud service system, wherein the service workflow indicates an interaction workflow among the models and a model execution sequence within a single service; a service performance model training unit, configured to use training data to train a service performance model of each service in the system simulation model, wherein the training data comprises part or all of the test data collected from the cloud service system in a testing environment, and the service performance model defines a resource consumption of a single request running on a service in the system simulation model; a system simulating unit, configured to use the service performance model and the system simulation model to perform system simulation with a given resource configuration set and the resource limit settings to obtain a system performance KPI; and a resource configuration determining unit, configured to determine a resource configuration with the best system performance KPI in the resource configuration set as the resource configuration of the cloud service system.

In some embodiments, the apparatus further comprises: a target performance KPI obtaining unit, configured to obtain a target performance KPI of the system simulation model; and a resource configuration removing unit, configured to remove resource configurations, which have a system performance KPI exceeding the target performance KPI, from the resource configuration set, wherein the resource configuration determining unit is configured to determine a resource configuration, which has the best system performance KPI in the resource configuration set after the removal processing, to be the resource configuration of the cloud service system.

In some embodiments, the system simulation tool has a visualized operation interface, and the visualized operation interface comprises a model display area. The model obtaining unit is configured to obtain a selected model in response to a model selection operation on the model library in the model display area.

In some embodiments, the system simulation tool has a visualized operation interface, and the visualized operation interface comprises a model obtaining area. The model obtaining unit is configured to obtain a model required for each service from the model library in response to inputting of service identification information or service configuration information of each service of the cloud service system in the model obtaining area.

In some embodiments, the visualized operation interface comprises a model editing area, the apparatus further comprises: a model presenting unit, configured to present an obtained model in the model editing area, and the service workflow creating unit is configured to create a service workflow among the models in response to a linking operation between corresponding endpoints of the obtained models in the model editing area.

In some embodiments, the service workflow creating unit is configured to create a service workflow among the obtained models according to operation process information of each service.

In some embodiments, the model library further comprises a service model set, and the service model set comprises standard service workflow models, standard service performance models and/or standard cloud service performance models, and the model obtaining unit is also configured to obtain a corresponding standard service workflow model, standard service performance model and/or standard cloud service performance model from the service model set in response to comprising a standard service in each service of the cloud service system.

In some embodiments, the test data comprises verification data, and the apparatus may further comprise: a model verifying unit, configured to, before using the service performance model and the system simulation model to perform system simulation with a given resource configuration set to obtain the system performance KPI, use the verification data to perform model verification, wherein, when the model verification fails, the operations of the model obtaining unit, the resource limit setting obtaining unit, the service workflow creating unit and the service performance model training unit are executed again.

As another example, some embodiments include a computing device comprising: at least one processor; and a memory coupled to the at least one processor, which is configured to store an instruction that, when executed by the at least one processor, causes the at least one processor to perform the method for determining a resource configuration described above.

As another example, some embodiments include a machine readable medium storing an executable instruction that, when executed, causes a machine to perform the method for determining a resource configuration described above.

As another example, some embodiments include a computer program product which is tangibly stored in a computer-readable medium and comprises a computer-executable instruction that, when executed, causes at least one processor to perform the method for determining a resource configuration described above.

BRIEF DESCRIPTION OF THE DRAWINGS

The essence and advantages of the teachings of the present disclosure may be further understood by referring to the accompanying drawings below. In the drawings, similar components or features may have the same numerals.

REFERENCE NUMERALS IN THE DRAWINGS

Figure 1:
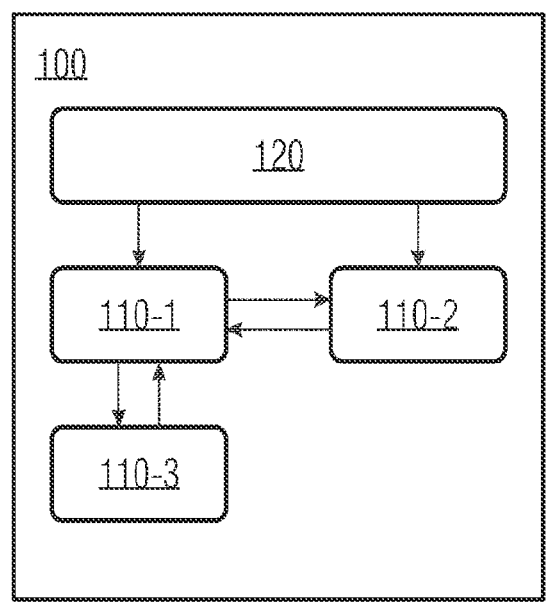
FIG. 1 is an exemplary schematic diagram of an interactive elastic cloud service system incorporating teachings of the present disclosure.

100 Interactive elastic cloud service system
110-1, 101-1 and 301-1 Cloud service A
110-2, 101-2 and 301-2 Cloud service B
110-3, 101-3 and 301-3 Cloud service C
103 Load generator
120, 102, 202 and 302 Auto-scaling service
1 Exemplary environment
10 Interactive elastic cloud service system in a testing environment
20 System simulation tool
201 Model library
202 Apparatus for determining a resource configuration
30 Interactive elastic cloud service system in a production environment
40 Test data
50 Resource configuration
300 Model library
310, 611, 711 and 811 Basic hardware model set
311 CPU
312 Bandwidth
313 Disk
314 Memory
320, 613, 713 and 813 Cloud infrastructure model set
321 VM
322 Container
323 Auto-scaling

330, 615, 715 and 815 Basic software model set
331 Event generator
332 Event handler
333 Event transmitter
334 Resource pool
340, 617, 717 and 817 Service model set
341 Standard service workflow model
342 Standard service performance model
343 Standard cloud service performance model
400 Auto-scaling service processing mechanism
410 Service model
420 Auto-scaling service
430 VM model
440 KPI value
450 Resource parameter modification
500 Process of determining a resource configuration
510 Model obtaining
520 Obtaining resource limit settings
530 Creating service workflows
540 Training service performance models
550 System simulation
560 Determining a resource configuration
600, 700 and 800 Visualized operation interface
620 and 720 Model display area
820 Model obtaining area
630, 730 and 830 Model editing area
1200 Apparatus for determining a resource configuration
1210 Model obtaining unit
1220 Resource limit setting obtaining unit
1230 Service workflow creating unit
1240 Service performance model training unit
1250 System simulating unit
1260 Resource configuration determining unit
1300 Computing device
1310 Processor
1320 Memory
1330 Internal memory
1340 Communication interface
1360 Bus

DETAILED DESCRIPTION

The subject described herein will now be discussed by referring to some exemplary implementations. It should be understood that the discussion of these implementations is only intended to enable those skilled in the art to better understand and realize the subject described herein, and is not intended to limit the scope, applicability, or examples set forth in the claims. The functions and arrangement of the discussed elements may be changed without departing from the scope of the specification. Various processes or components may be deleted, replaced or added in each example as needed. For example, the method described herein may be executed in a sequence different from the described sequence, and various steps may be added, omitted, or combined. In addition, the features described in relation to some examples may also be combined in other examples.

As used herein, the term "comprising" and its variations is an open term that means "including but not limited to". The term "based on" means "at least partially based on". The term "one embodiment" or "an embodiment" means "at least one embodiment". The term "another embodiment" means "at least one other embodiment". The term "first", "second", etc. may refer to different or the same objects. Other definitions, either explicit or implicit, may be included below. Unless clearly indicated in the context, the definition of a term is consistent throughout the description.

A cloud service refers to obtaining a required service through a network in an on-demand and easy-to-scale manner. Such services can be services related to IT, software and the Internet, or other services. With cloud services, all the software, hardware and data required by a company can be put on a network, and connected by different IT devices at any time and place, for data access, computing, etc. Examples of cloud service may include public clouds and private clouds.

FIG. 1 is an exemplary schematic diagram of an interactive elastic cloud service system 100. As shown in FIG. 1, the interactive elastic cloud system 100 comprises interactive cloud service A110-1, interactive cloud service B110-2, interactive cloud service C110-3 and auto-scaling service 120. It should be noted that FIG. 1 shows only an example of an interactive elastic cloud service system. In other examples, it may comprise more or less interactive cloud services.

Interactive cloud services A110-1, B110-2 and C110-3 provide different service capabilities, and each of the interactive cloud services A110-1, B110-2 and C110-3 respectively sends packets to other cloud services to interact with each other through calling an interface of another cloud service or via a network.

Auto-scaling service 120 may be provided by a cloud provider, for example, AWS, Alibaba Cloud, etc., and is used to implement the elasticity feature of each of the interactive services A110-1, B110-2 and C110-3. With auto-scaling service 120, the deployment of each of the interactive services A110-1, B110-2 and C110-3 can be changed by satisfying certain conditions. For example, when the CPU utilization is high, the availability and performance of a service can be improved by increasing the number of virtual machines.

The cloud service system needs to run on the cloud throughout its life cycle, including the development and operation of the cloud service system. In this case, it is necessary to know how to make full use of cloud services with the optimal resource configuration, especially for those cloud service systems that require a large amount of cloud services and infrastructure resources.

The performance modeling approach is applied to resource configuration optimization of cloud service systems. But in the performance modeling approach, performance modeling and simulation requires in-depth knowledge of computer systems and mathematical or statistical skills. Moreover, the creation of performance models is time consuming and error prone, especially for complex systems with interacting services, due to the many parameters and conditions that need to be considered in performance models. In addition, most performance modeling methods can only be applied to resource configuration optimization of steady-state systems, but not dynamic or elastic systems.

In view of the above, the present disclosure provides a solution for determining the resource configuration of a cloud service system by use of a system simulation tool. In this solution, the system simulation tool comprises a model library, which comprises a basic hardware model set, a cloud infrastructure model set, and a basic software model set. To determine the resource configuration, standardized models in the model library are used to create a system simulation model, and a service performance training module is used to automatically train the test data collected from a cloud service system in a testing environment to obtain model parameters of the system simulation model. After the system simulation model is obtained in this way, the obtained system simulation model is used to perform model simulation, thereby determining the optimal resource configuration. In this way, the process of determining the resource configuration of a cloud service system can be made simpler and easier.

Figure 2:
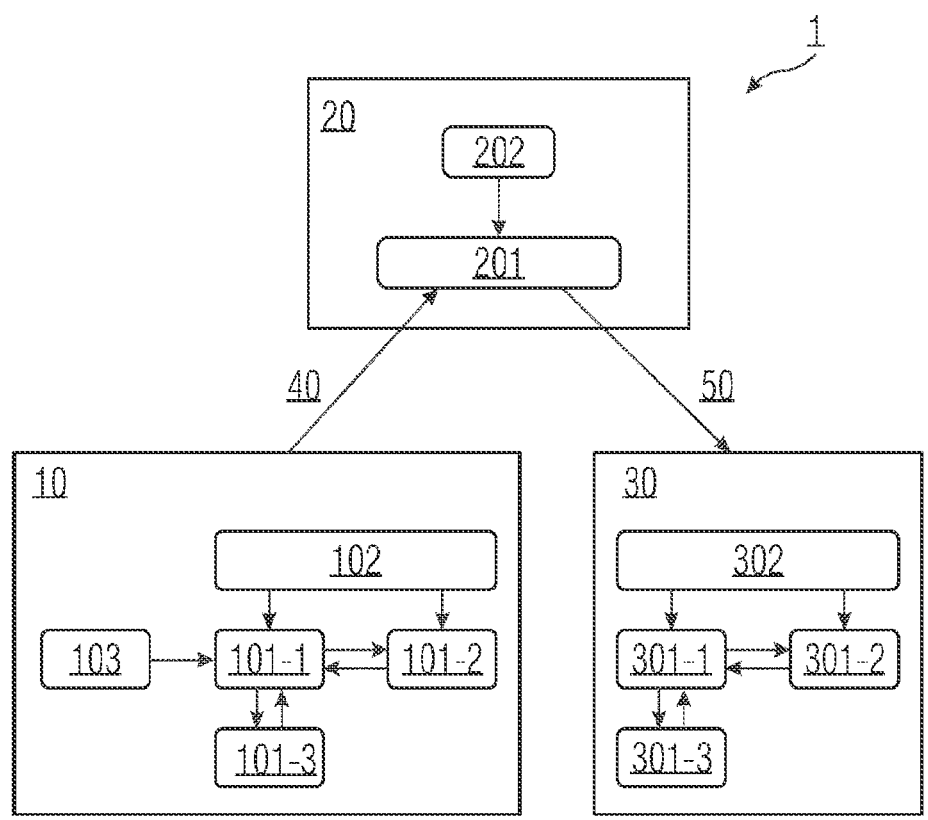
FIG. 2 is an exemplary schematic diagram of a resource configuration determining architecture used for determining the resource configuration of an interactive elastic cloud service system incorporating teachings of the present disclosure.

FIG. 2 is a schematic diagram of an exemplary environment 1 for resource configuration determining used for determining the resource configuration of an interactive elastic cloud service system incorporating teachings of the present disclosure. As shown in FIG. 2, the exemplary environment 1 comprises an interactive elastic cloud system 10 in a testing environment, a system simulation tool 20, and an interactive elastic cloud system 30 in a production environment.

In addition to interactive service A101-1, interactive cloud service B101-2, interactive cloud service C101-3 and auto-scaling service 102, the interactive elastic cloud system 10 further comprises a load generator 103. The structures and functions of interactive service A101-1, interactive cloud service B101-2, interactive cloud service C101-3 and auto-scaling service 102 are the same as those of the corresponding components shown in FIG. 1.

The load generator 103 is configured to simulate concurrent users in a production environment. During testing, the load generator 103 can, for example, generate different concurrent requests or different request contents, as well as production ramp-up/ramp-down strategies.

A benchmark test may be performed on interactive service A101-1, interactive cloud service B101-2 and interactive cloud service C101-3 under different loads, thereby obtaining test data 40. For example, the benchmark test may be performed with 500/1000/1500 concurrent users or threads.

The test data 40 may comprise system resource states and service performance data. Examples of system resource states may include, but are not limited to, CPU utilization and network input/output per second. Examples of service performance data may include, but are not limited to, QPS, response time, etc.

The test data 40 may be collected by use of some available system monitoring tools or services. Examples of system monitoring tools or services may include, but are not limited to, cloud monitoring services provided by cloud providers, for example, Cloud Watch of AWS, Cloud Monitor of Alibaba Cloud, etc., and OSS service monitoring tools, for example, Sky Walking, Zipkin, etc. These system monitoring tools or services collect and store test data, and provide an API interface for data query/reading for other components (for example, the system simulation tool 20) to perform data query/reading.

The system simulation tool 20 comprises a model library 201 and an apparatus 202 for determining a resource configuration. The model library 201 comprises a plurality of model sets, and the models in each model set may be standardized models. Models in different model sets may be combined to obtain more complex models. Each model may be reused or configured for different simulation schemes. In addition, each model may also be replaced by a more suitable model.

Figure 3:
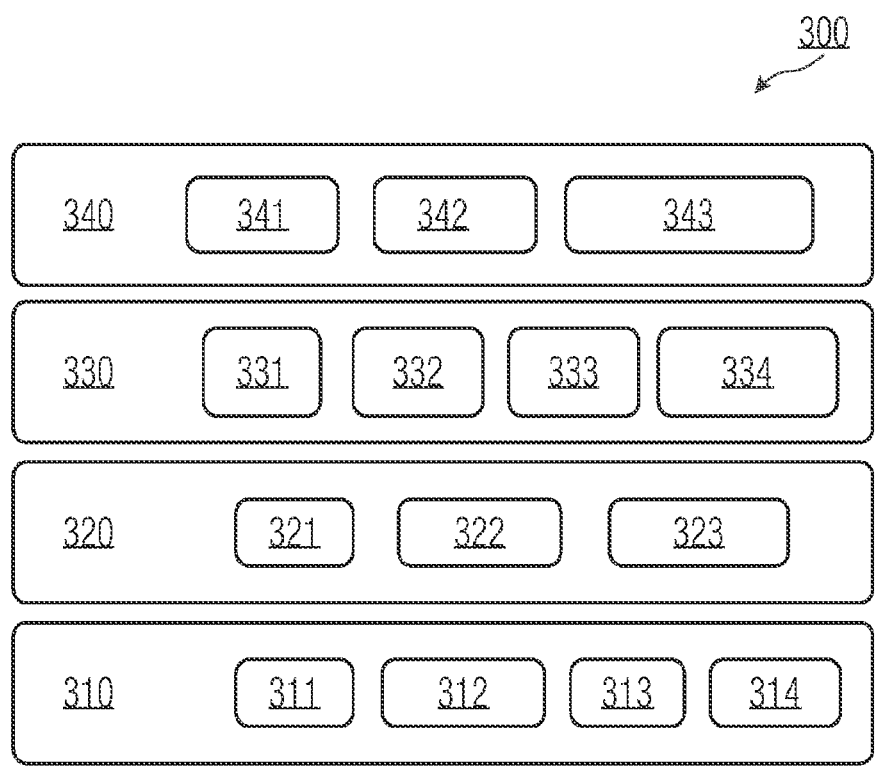
FIG. 3 is an exemplary schematic diagram of the model library of the system simulation tool incorporating teachings of the present disclosure.

FIG. 3 is an exemplary schematic diagram of the model library 300 of the system simulation tool incorporating teachings of the present disclosure. As shown in FIG. 3, the model library 300 may comprise a basic hardware model set 310, a cloud infrastructure model set 320, a basic software model set 330, and a service model set 340. In one example, the basic hardware model set 310, the cloud infrastructure model set 320, the basic software model set 330 and the service model set 340 may be arranged in the model library 300 in a layered manner.

The basic hardware model set 310 comprises resource models of computer hardware, and the computer hardware may include, for example, a CPU 311, a bandwidth 312, a disk 313 and a memory 314. The basic hardware models can be used to create more complex models and can be extended. For example, when different CPUs have different scheduling policies, a plurality of CPU scheduling models can be extended to support different hardware provided by cloud providers.

The basic hardware models are the basis for every service model. The basic hardware models can simulate hardware behaviors, including how to consume resources in a concurrent state, how much time it will take to use a certain amount of resources, etc., so that the model accuracy of the basic hardware models is a key factor affecting the final system simulation result.

The cloud infrastructure model set 320 may comprise basic service models provided by cloud providers, which are the resources to run interactive services and the targets for resource optimization. Since interactive elastic services run on the resources of the cloud infrastructure, resource constraints are important for modeling and evaluation. Examples of cloud infrastructure may include, but are not limited to, virtual machines (VMs), containers, and an auto-scaling service. Each cloud infrastructure may be modeled and configured. Accordingly, the cloud infrastructure model set 320 may comprise a virtual machine (VM) model 321, a container model 322 and an auto-scaling service model 323. Each cloud infrastructure model may be integrated and used together with other models.

Cloud providers provide auto-scaling services for virtual machine users, so that virtual machine users can make full use of their virtual machines. In some cases, some virtual machines are idle and unused for a long time. If the user releases these virtual machines, when the load on a service suddenly rises, it will be possible for the service not to maintain the load. The auto-scaling service may be used to realize the elasticity feature of a user service.

An auto-scaling model simulates the behavior of an auto-scaling service, and provides the following functions: (1) an auto-scaling policy configuration function, for example, configuring the KPI and the threshold; (2) an automatic checking function, for example, automatically detecting whether the configured KPI reaches the threshold; (3) a scaling behavior simulation function; (4) resource parameter modification, for example, modification of the number of virtual machines of a service.

Figure 4:
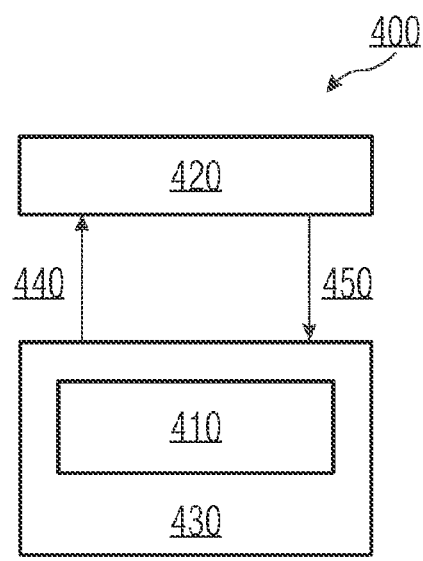
FIG. 4 is an exemplary schematic diagram of the processing mechanism of the auto-scaling service incorporating teachings of the present disclosure.

FIG. 4 is an exemplary schematic diagram of the processing mechanism of the auto-scaling service incorporating teachings of the present disclosure. As shown in FIG. 4, the user can define the conditions under which the number of virtual machines should be increased or reduced. For example, if the CPU utilization reaches 80%, 1 virtual machine should be added to improve the availability and performance of the service.

To perform auto-scaling service processing, the KPI and the threshold are configured first. Subsequently, it is automatically detected whether the configured KPI reaches the threshold. If the threshold is reached, resource parameter modification is performed, for example, modifying the number of virtual machines of a service.

The basic software model layer 330 may comprise an event generator model 331, an event handler model 332, an event transmitter model 333, and a resource pool model 334. An event is the basic concept of discrete event simulation. An event is an object that includes properties describing the event and can be sent from one service to another.

The event generator 331 may be a peer of the load generator 103 in a testing environment. The event handler 332 can configure the logic and delay of a service. Events can be sent from one service to another by use of the event transmitter 333. The resource pool model 334 is used to simulate the resource consumption of the software and the resource limits in the software, for example, locking, connection limit, token limit, etc.

The service model set 340 may comprise standard service workflow models 341, standard service performance models 342, and standard cloud service performance models 343. A service workflow model is a locally created service workflow model. A service performance model is built for a locally created service and is used for service performance analysis. A service performance model can output, for example, the resource consumptions of a single request running on a service under different input loads. A cloud service performance model is a service performance model established for cloud services provided by cloud providers and is provided for service performance analysis of cloud services provided by cloud providers. The cloud service performance model can, for example, output the response times of a service under different input loads. In this specification, the term "standard model" refers to a model that is modularized as a standard model for modular use because it is a commonly used model and is suitable for many application scenarios.

The apparatus 202 for determining a resource configuration is configured to use the model library to create a system simulation model and to use the test data collected from the cloud service system in a testing environment to automatically train the service performance models of the system simulation model, wherein the service performance models are integrated in the system simulation model. After the system simulation model is obtained in this way, the apparatus 202 for determining a resource configuration uses the obtained system simulation model to perform model simulation and determines the optimal resource configuration 50 according to the model simulation result.

After the resource configuration is determined, the apparatus 202 for determining a resource configuration provides the determined resource configuration 50 to the interactive elastic cloud service system 30 in the production environment to execute the production plan.

Figure 5:
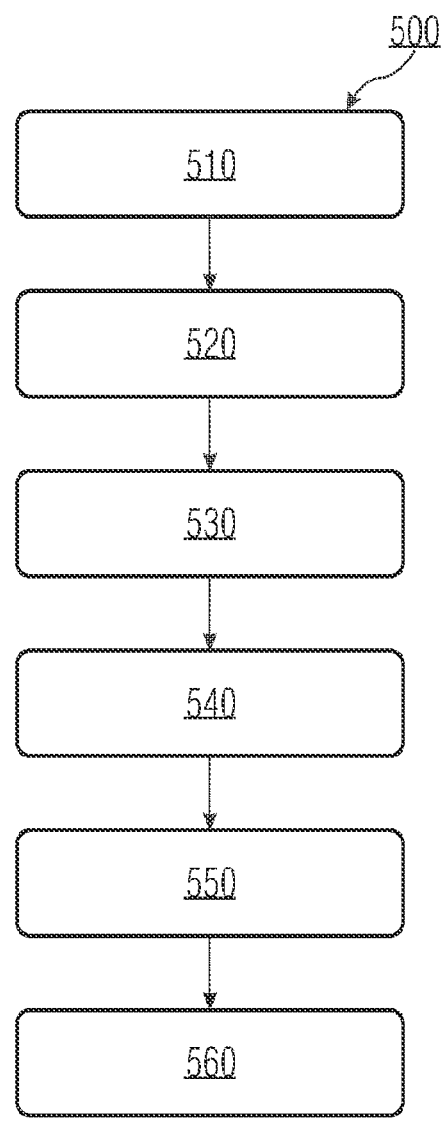
FIG. 5 is an exemplary flowchart of the method for determining the resource configuration of an interactive elastic cloud service system incorporating teachings of the present disclosure.

FIG. 5 is an exemplary flowchart of the method 500 for determining the resource configuration of an interactive elastic cloud service system incorporating teachings of the present disclosure. The method is executed by the apparatus 202 for determining a resource configuration. As shown in FIG. 5, in block 510, the models required for each service of the interactive elastic cloud service system are obtained from the model library.

In one example, the model obtaining process may be initiated, for example, in response to a request for determining the resource configuration, which may include service configuration information of the interactive elastic cloud service system or service identification information of each service. Accordingly, the apparatus 202 for determining a resource configuration can automatically obtain the models required for each service from the model library according to the service configuration information of the interactive elastic cloud service system or the service identification information of each service.

Figure 6:
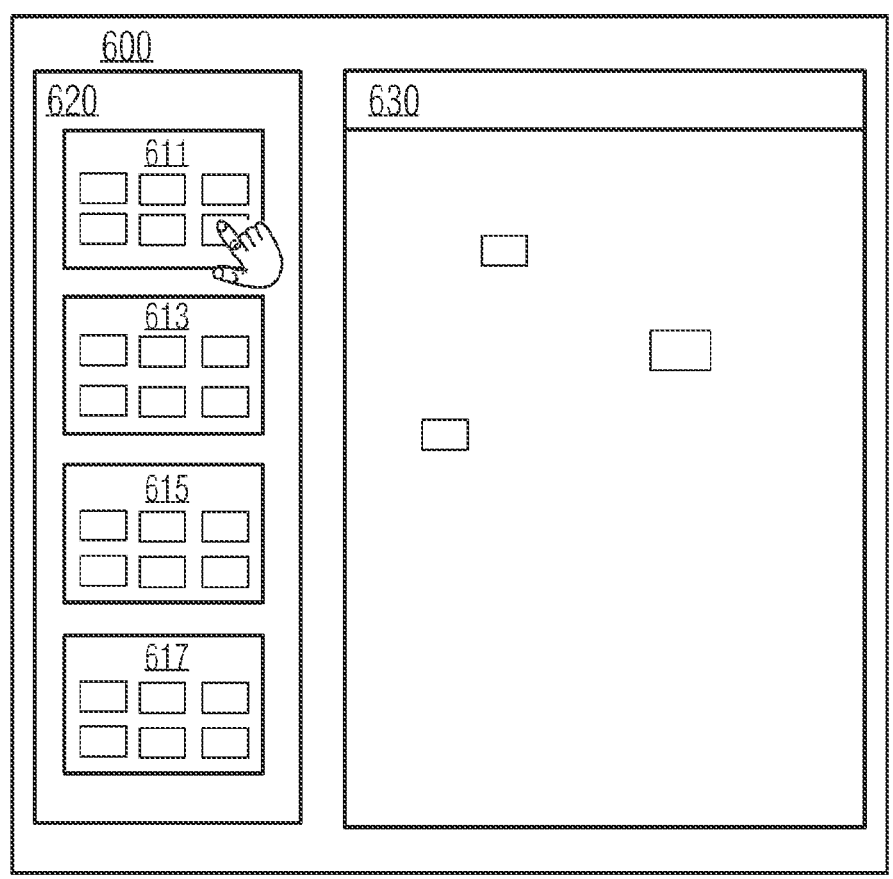
FIG. 6 is a schematic diagram of an example of the visualized operation interface of the system simulation tool incorporating teachings of the present disclosure.
Figure 7:
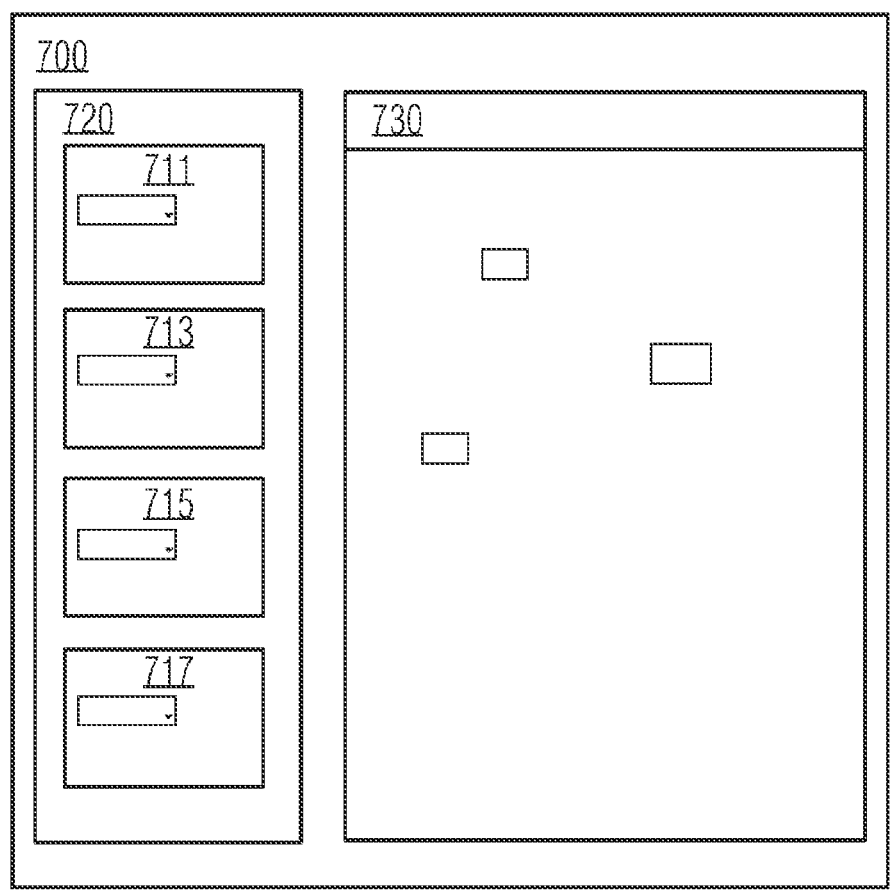
FIG. 7 is a schematic diagram of another example of the visualized operation interface of the system simulation tool according to the embodiments of the present disclosure.
Figure 8:
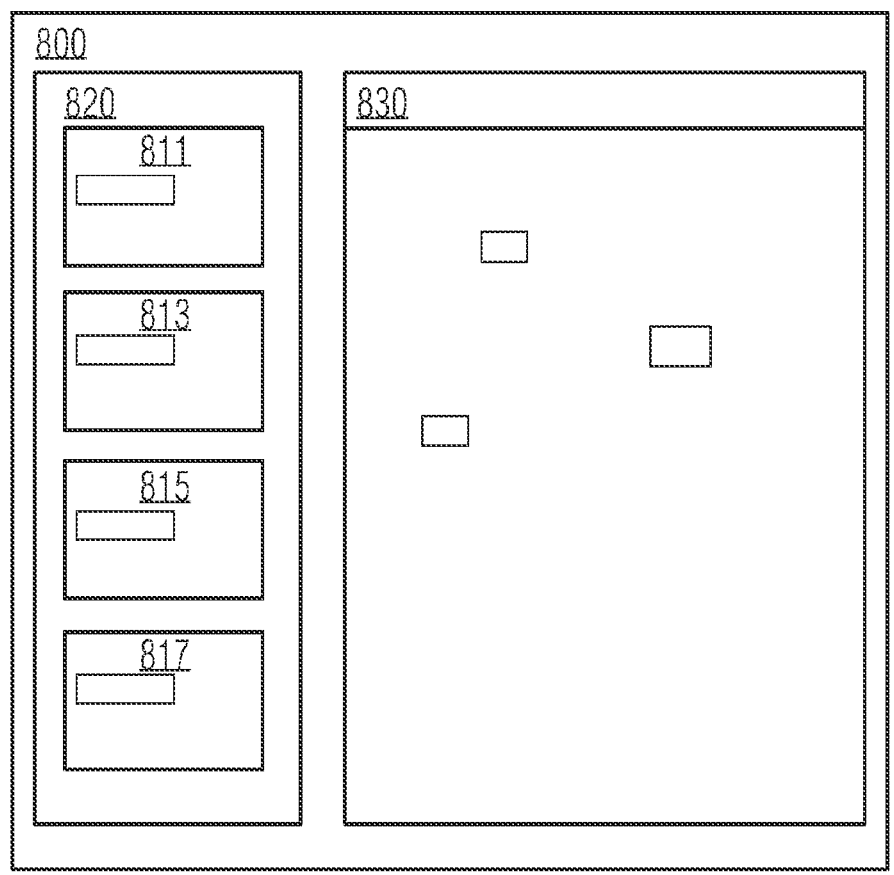
FIG. 8 is a schematic diagram of another example of the visualized operation interface of the system simulation tool incorporating teachings of the present disclosure.

In one example, the system simulation tool 20 may have a visualized operation interface, for example, the visualized operation interfaces 600, 700 and 800 as shown in FIGS. 6, 7 and 8.

The visualized operation interface 600 shown in FIG. 6 comprises a model display area 620 and a model editing area 630. The basic hardware model set 611, the cloud infrastructure model set 613, the basic software model set 615 and the service model set 617 are displayed in the model display area 620 in a layered manner.

In the example shown in FIG. 6, the model obtaining process may be completed by performing a selection operation on the models in the model library, which can be performed, for example, by a user or automatically by a machine. The selection operation may be, for example, clicking or dragging, as shown in FIG. 6. Accordingly, the apparatus 202 for determining a resource configuration obtains a selected model in response to a model selection operation on the model library in the model display area.

The visualized operation interface 700 shown in FIG. 7 comprises a model display area 720 and a model editing area 730. The basic hardware model set 711, the cloud infrastructure model set 713, the basic software model set 715 and the service model set 717 are displayed in the model display area 720 in the form of a menu. Accordingly, a model can be selected through a drop-down menu.

The visualized operation interface 800 shown in FIG. 8 comprises a model obtaining area 820 and a model editing area 830. In the model obtaining area 820, an information input field is provided respectively for the basic hardware model set 811, the cloud infrastructure model set 813, the basic software model set 815 and the service model set 817, for inputting the service identification information or service configuration information of each service of the cloud service system information. Accordingly, the apparatus 202 for determining a resource configuration obtains a model required for each service from the model library in response to inputting of the service identification information or service configuration information of each service of the cloud service system in the model obtaining area. It should be noted that one information input field is provided for each of the model sets in FIG. 8. Optionally, only one information input field may be provided for all the model sets.

In some embodiments, after the models required for each service are obtained as described above, each obtained model may be presented in the model editing area 630/730/830.

Figure 9:
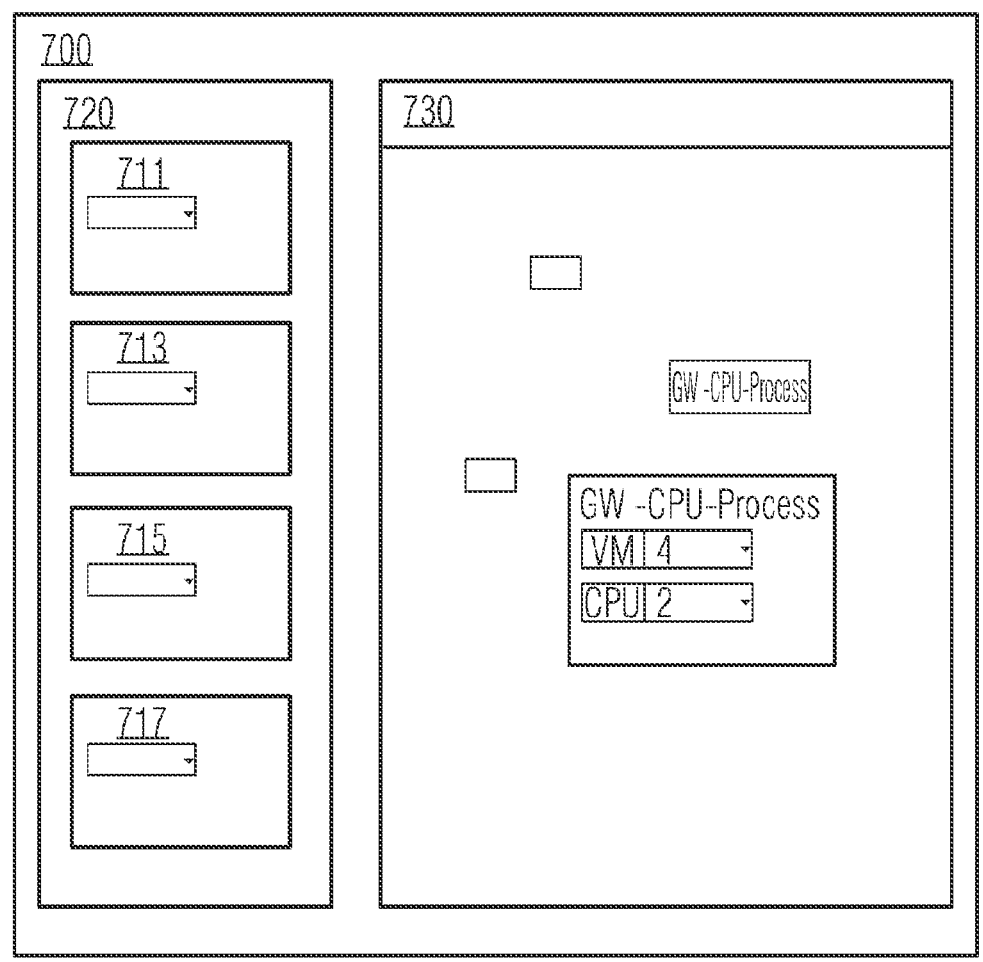
FIG. 9 is an exemplary schematic diagram of the resource limit settings incorporating teachings of the present disclosure.

In block 520, resource limit settings are set for the models required for each service. FIG. 9 is an exemplary schematic diagram of the resource limit settings incorporating teachings of the present disclosure. As shown in FIG. 9, after clicking a model in a service, for example, after clicking the model "GW-CPU-Process", a dialog box may pop up for inputting resource limit settings, for example, the number of VMs limited to 4, and the number of CPU cores limited to 2.

Figure 10:
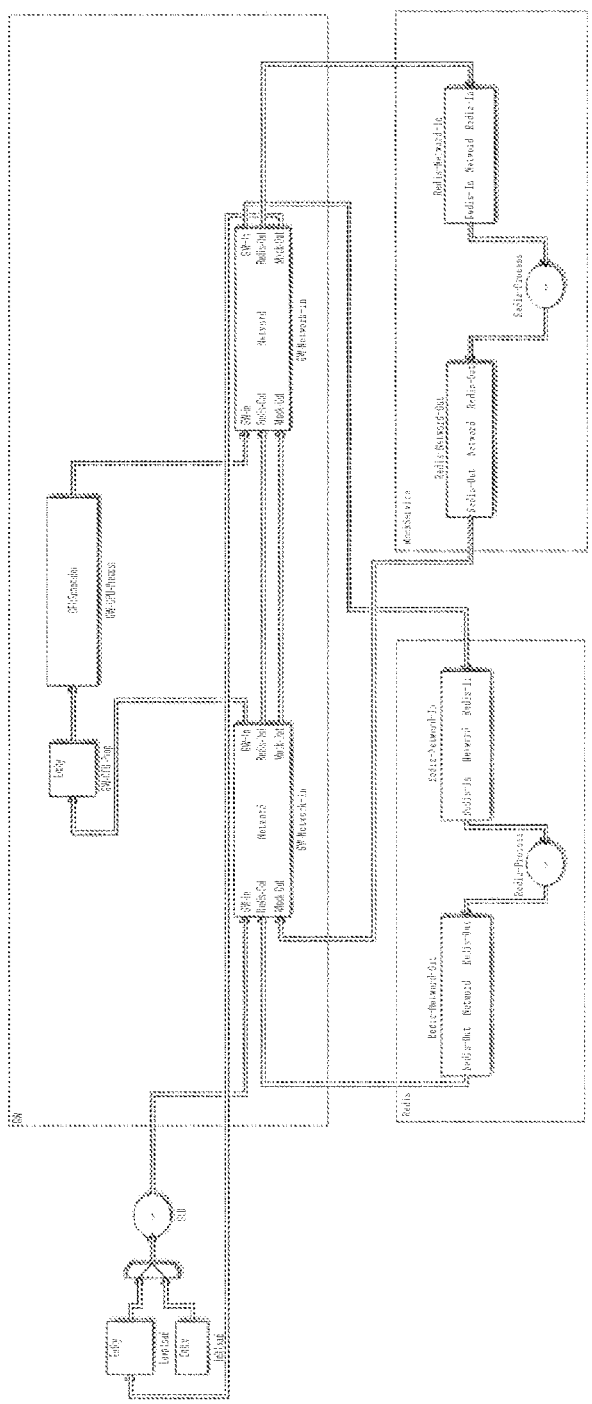
FIG. 10 is a schematic diagram of the result after creating the service workflows incorporating teachings of the present disclosure.

After the models required for each service are obtained as described above, in block 530, a service workflow among the obtained models is created to obtain a system simulation model of the cloud service system. In the present disclosure, a service workflow is used to indicate the interaction workflow among individual models and the sequence of model execution in a single service. After the service workflow creation is completed, events will be sent from one service to another, and the entire simulation model will be triggered to run an event flow. FIG. 10 is a schematic diagram of the result after creating the service workflows according to the embodiments of the present disclosure.

In some embodiments, the apparatus 202 for determining a resource configuration can create a service workflow among the obtained models according to the operation process information of each service.

In some embodiments, when all the obtained models are presented in the model editing area, a linking operation may be performed on the corresponding endpoints of the obtained models in the model editing area. Accordingly, the apparatus 202 for determining a resource configuration creates a service workflow among the models in response to the linking operation between the corresponding endpoints of the obtained models in the model editing area, thereby obtaining a system simulation model.

After the system simulation model is obtained as described above, in block 540, training data is used to train the service performance models of the system simulation model, and a service performance model defines the resource consumption of running a single request on a service in the system simulation model. Here, the training data may comprise part or all of the test data collected from the cloud service system in a testing environment. For example, the inputs of a service performance model may comprise the input parameters of the load test, for example, the load of an API request, etc. The outputs of a service performance model may comprise the resource consumption of a single request, MI (million instructions) on the CPU, memory increase, and packet size on the network. In addition, when the service is a cloud service (for example, Redis or Table Store) provided by a cloud provider, since the service works as a black box service, the output of the service performance model may be characterized by the response time of the service.

In block 550, using the service performance models and the system simulation model, system simulation is performed with a given resource configuration set and the resource limit settings, to obtain a system performance KPI. By use of the service performance model that describes the resource consumption of a single request or the response time of a service, the system behaviors and system performance KPIs under different loads can be calculated by the underlying models, for example, hardware models and software models.

In block 560, the resource configuration with the best system performance KPI in the resource configuration set is determined as the resource configuration of the cloud service system.

Figure 11:
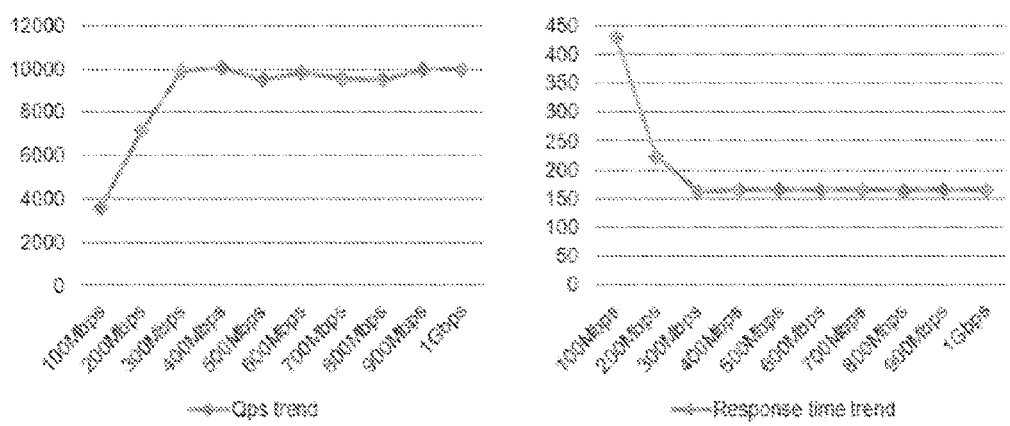
FIG. 11 is an exemplary schematic diagram of the simulation results with different resource configurations incorporating teachings of the present disclosure.

FIG. 11 is an exemplary schematic diagram of the simulation results with different common bandwidths incorporating teachings of the present disclosure. As shown in FIG. 11, when the common bandwidth is set to 300 Mbps, the service will reach the best performance in terms of the QPS and the response time. As the bandwidth increases, the service performance will not improve. Therefore, the optimal common bandwidth is 300 Mbps, and thus the common bandwidth of 300 Mbps is determined as the resource configuration of the cloud service system.

In addition, in one example, a target performance KPI for the system simulation model may also be set. Accordingly, resource configurations that have a system performance KPI exceeding the target performance KPI are removed from the resource configuration set. Then, the resource configuration that has the best system performance KPI in the resource configuration set after the removal processing is determined to be the resource configuration of the cloud service system.

In addition, optionally, in one example, the test data comprises verification data. Before the service performance model and the system simulation model are used to perform system simulation with a given resource configuration set and the resource limit settings to obtain the system performance KPI, the method may further comprise: using the verification data to perform model verification, wherein, when the model verification fails, the process of creating a system simulation model and a service performance model is executed again.

For example, a benchmark test may be performed for different concurrencies, for example, 200/500/1000/1500 concurrencies, thereby obtaining the test data. Subsequently, data are selected from the test data of 200/500 concurrencies to build a system simulation model. After the system simulation model is built, the simulation results with 1000/1500 concurrencies are compared with the test data, to check whether the system simulation model can predict the system behavior under different loads well.

In some embodiments, the method may further comprise: performing a performance test on the determined resource configuration. For example, an NFR test may be performed on the determined resource configuration.

In some embodiments, when the model library comprises a service model set, the method may further comprise: obtaining a corresponding standard service workflow model, standard service performance model and/or standard cloud service performance model from the service model set in response to comprising a standard service in each service of the cloud service system.

In addition, it should be noted that an interactive elastic cloud service system is used as an example for description in the above examples. In other embodiments of this specification, other types of cloud service systems may also be used. In addition, it should be noted that the model library may comprise no service model set in other embodiments of this specification.

Figure 12:
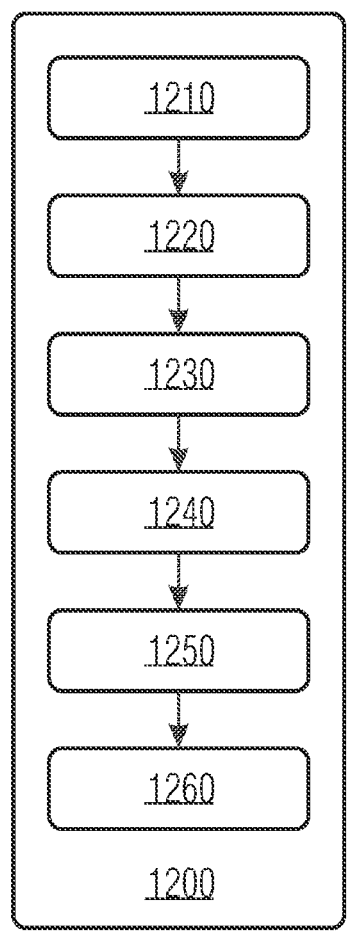
FIG. 12 is a block diagram of the apparatus for determining a resource configuration incorporating teachings of the present disclosure.

FIG. 12 is a block diagram of the apparatus 1200 for determining a resource configuration incorporating teachings of the present disclosure. As shown in FIG. 12, the apparatus 1200 for determining a resource configuration comprises a model obtaining unit 1210, a resource limit setting obtaining unit 1220, a service workflow creating unit 1230, a service performance model training unit 1240, a system simulating unit 1250, and a resource configuration determining unit 1260.

The model obtaining unit 1210 is configured to obtain models required for each service of a cloud service system from a model library. The operation in block 510 described above by referring to FIG. 5 may be referenced for the operation of the model obtaining unit 1210.

The resource limit setting obtaining unit 1220 is configured to obtain the resource limit settings of each required model. The operation in block 520 described above by referring to FIG. 5 may be referenced for the operation of the resource limit setting obtaining unit 1220.

The service workflow creating unit 1230 is configured to create a service workflow among the obtained models, to obtain a system simulation model of the cloud service system, wherein a service workflow indicates the interaction workflow among the models and the sequence of model execution in a single service. The operation in block 530 described above by referring to FIG. 5 may be referenced for the operation of the service workflow creating unit 1230.

The service performance model training unit 1240 is configured to use training data to train service performance models of the system simulation model, wherein the training data comprises part or all of the test data collected from the cloud service system in a testing environment, and a service performance model is used to define the resource consumption of a single request running on a service in the system simulation model. The operation in block 540 described above by referring to FIG. 5 may be referenced for the operation of the service performance model training unit 1240.

The system simulating unit 1250 is configured to use the service performance models and the system simulation model to perform system simulation with a given resource configuration set and the resource limit settings, to obtain a system performance KPI. The operation in block 550 described above by referring to FIG. 5 may be referenced for the operation of the system simulating unit 1250.

The resource configuration determining unit 1260 is configured to determine the resource configuration with the best system performance KPI in the resource configuration set as the resource configuration of the cloud service system. The operation in block 560 described above by referring to FIG. 5 may be referenced for the operation of the resource configuration determining unit 1260.

In some embodiments, the apparatus 1200 for determining a resource configuration may further comprise a target performance KPI obtaining unit (not shown) and a resource configuration removing unit (not shown). The target performance KPI obtaining unit is configured to obtain a target performance KPI of the system simulation model. The resource configuration removing unit is configured to remove resource configurations, which have a system performance KPI exceeding the target performance KPI, from the resource configuration set. Accordingly, the resource configuration determining unit 1260 determines the resource configuration, which has the best system performance KPI in the resource configuration set after the removal processing, to be the resource configuration of the cloud service system.

In some embodiments, the system simulation tool may have a visualized operation interface, and the visualized operation interface comprises a model display area. The model obtaining unit 1210 obtains a selected model in response to a model selection operation on the model library in the model display area.

In some embodiments, the system simulation tool has a visualized operation interface, and the visualized operation interface comprises a model obtaining area. The model obtaining unit 1210 obtains a model required for each service from the model library in response to inputting of the service identification information or service configuration information of each service of the cloud service system in the model obtaining area.

In some embodiments, when the model library further comprises a service model set, the model obtaining unit 1210 is further configured to obtain a corresponding standard service workflow model, standard service performance model and/or standard cloud service performance model from the service model set in response to a standard service being comprised in each service of the cloud service system.

In some embodiments, the visualized operation interface may further comprise a model editing area. Accordingly, the apparatus 1200 for determining a resource configuration further comprises a model presenting unit (not shown). The model presenting unit is configured to present each model obtained in the model editing area. Accordingly, the service workflow creating unit 1230 creates a service workflow among the models in response to a linking operation between the corresponding endpoints of the obtained models in the model editing area.

In some embodiments, in one example, the service workflow creating unit 1230 may be configured to create a service workflow among the obtained models according to the operation process information of each service.

In some embodiments, when the test data comprises verification data, the apparatus 1200 for determining a resource configuration may further comprise a model verifying unit (not shown). The model verifying unit is configured to use verification data to perform model verification before system simulation is performed using the service performance models and the system simulation model with a given resource configuration set and the resource limit settings to obtain a system performance KPI. When the model verification fails, the operations of the model obtaining unit, the resource limit setting obtaining unit, the service workflow creating unit and the service performance model training unit are executed again.

The method and the apparatus for determining a resource configuration according to the present disclosure are described above by referring to FIGS. 1 to 12. The above apparatus for determining a resource configuration may be implemented as hardware or software or a combination thereof.

Figure 13:
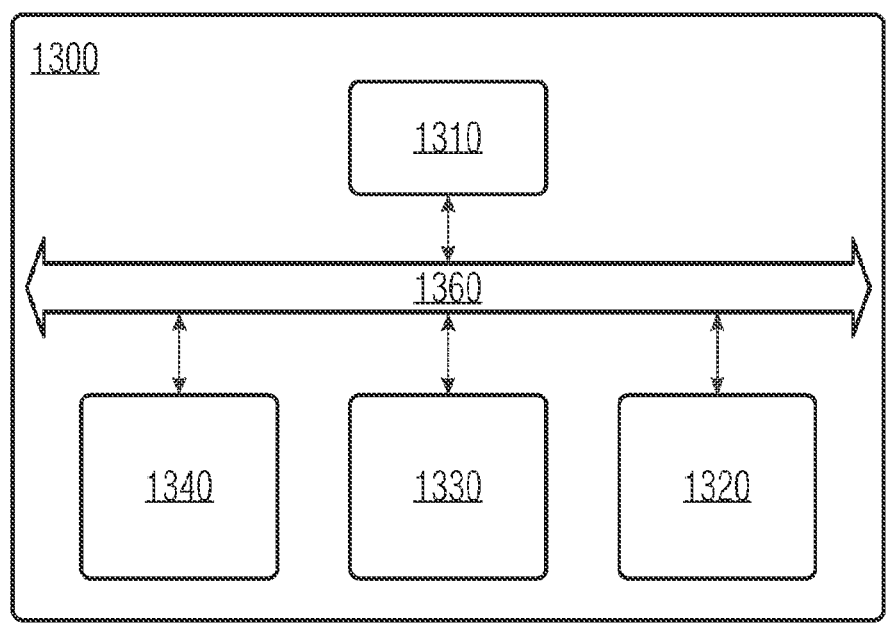
FIG. 13 is a schematic diagram of a computing device used for determining the resource configuration of a cloud service system incorporating teachings of the present disclosure.

FIG. 13 is a schematic diagram of a computing device used for determining the resource configuration of a cloud service system according to the embodiments of the present disclosure. As shown in FIG. 13, the computing device 1300 may comprise at least one processor 1310, a memory (for example, a non-volatile memory) 1320, an internal memory 1330 and a communication interface 1340, and the at least one processor 1310, the memory 1320, the internal memory 1330 and the communication interface 1340 are connected together via a bus 1360. The at least one processor 1310 can execute at least one computer-readable instruction (i.e., an element implemented in the form of software as described above) stored or encoded in the memory.

In some embodiments, a computer-executable instruction is stored in the memory, which, when executed, causes the at least one processor 1310 to: obtain a model required for each service of a cloud service system from a model library; obtain a resource limit setting for each required model; create a service workflow among the obtained models to obtain a system simulation model of the cloud service system, wherein the service workflow indicates an interaction workflow among the models and a model execution sequence within a single service; use training data to train a service performance model of each service in the system simulation model through a service performance model training module, wherein the training data comprises part or all of the test data collected from the cloud service system in a testing environment, and the service performance model defines a resource consumption of a single request running on a service in the system simulation model; use the service performance model and the system simulation model to perform system simulation with a given resource configuration set and the resource limit settings to obtain a system performance KPI through a discrete event simulation engine; and determine a resource configuration with the best system performance KPI in the resource configuration set as the resource configuration of the cloud service system.

It should be understood that the computer-executable instruction stored in the memory, when executed, causes the at least one processor 1310 to perform the various operations and functions in each embodiment of this specification described above by referring to FIGS. 1 to 12.

In some embodiments, a program product, for example, a machine-readable medium (for example, a non-transient machine-readable medium), is provided. The machine-readable medium may have instructions (i.e., elements implemented in the form of software as described above) that, when executed by a machine, cause the machine to execute the various operations and functions in each embodiment of this specification described above by referring to FIGS. 1 to 12. Specifically, a system or device equipped with a readable storage medium may be provided, the software program code for implementing the functions of any of the above embodiments is stored on the readable storage medium, and a computer or processor of the system or device can read and execute the instructions stored in the readable storage medium.

In this case, the program code itself read from the readable medium can implement the functions of any of the above embodiments, and so the machine readable code and the readable storage medium storing the machine readable code constitute part of the present invention.

Examples of the readable storage medium include floppy disks, hard disks, magneto-optical disks, optical disks (such as CD-ROM, CD-R, CD-RW, DVD-ROM, DVD-RAM, DVD-RW, DVD-RW), magnetic tape, volatile memory cards and ROM. Optionally, the program code may be downloaded from a server computer or a cloud via a communication network.

Those skilled in the art should understand that the various embodiments disclosed above can be transformed and modified without departing from the essence of the present invention. Therefore, the scope of the present invention should be limited by the appended claims.

It should be noted that not all steps and units in the above processes and system structure diagrams are necessary, and some steps or units can be ignored based on actual needs. The sequence of execution of the steps is not fixed and can be determined as needed. The device structure described in the above embodiments may be a physical structure or a logical structure, i.e., some units may be implemented by the same physical entity, or some units may be implemented by multiple physical entities or may be implemented by certain components in several independent devices working together.

In the above embodiments, the hardware units or modules may be implemented mechanically or electrically. For example, a hardware unit, module or processor may comprise a permanent dedicated circuit or logic (such as a dedicated processor, FPGA or ASIC) to complete the corresponding operation. The hardware unit or processor may also comprise a programmable logic or circuit (such as a general-purpose processor or other programmable processors), which may be temporarily set by software to complete the corresponding operation. The specific implementation method (mechanical, or by a dedicated permanent circuit, or a temporarily set circuit) may be determined based on the cost and time considerations.

The exemplary embodiments described above for specific implementations by referring to the drawings are not all the embodiments that can be implemented or fall within the scope of the claims. The term "exemplary" used throughout this description means "serving as an example, instance, or illustration", and does not mean "preferred to" or "advantageous over" other embodiments. For the purpose of providing an understanding of the described techniques, the specific implementations comprise specific details. However, these techniques can be implemented without these specific details. In some examples, in order to avoid incomprehensibility of the concepts of the described embodiments, structures and devices in the general common knowledge are shown in the form of block diagrams.

The foregoing description of the present disclosure is provided to enable anyone ordinarily skilled in the art to implement or use the present disclosure. For those ordinarily skilled in the art, various modifications to the present disclosure are obvious, and the general principles defined herein can also be applied to other modifications without departing from the scope of the present disclosure. Therefore, the present disclosure is not limited to the examples and designs described herein but is consistent with the widest scope that conforms to the principles and novel features disclosed herein.

What is claimed is:

1. A method for determining a resource configuration of a cloud service system by use of a system simulation tool, wherein the system simulation tool comprises a model library and an apparatus for determining a resource configuration, the model library comprises a basic hardware model set, a cloud infrastructure model set, and a basic software model set, the method comprising:
    obtaining a model required for each service of the cloud service system from the model library;
    obtaining a resource limit setting of each required model;
    creating a service workflow among the obtained models, to obtain a system simulation model of the cloud service system, wherein the service workflow indicates the interaction workflow among the models and the sequence of model execution in a single service;
    using training data to train a service performance model of each service in the system simulation model, wherein the training data comprises part or all of the test data collected from the cloud service system in a testing environment, and the service performance model defines a resource consumption of a single request running on a service in the system simulation model;
    using the service performance models and the system simulation model to perform system simulation with a given resource configuration set and the resource limit settings, to obtain a system performance KPI; and
    determining a resource configuration with the best system performance KPI in the resource configuration set as the resource configuration of the cloud service system.

2. The method as claimed in claim 1, wherein the cloud service system comprises an interactive elastic cloud service system, and the cloud infrastructure model set comprises an auto-scaling service model.

3. The method as claimed in claim 1, further comprising:
    obtaining a target performance KPI of the system simulation model;
    removing resource configurations, which have a system performance KPI exceeding the target performance KPI, from the resource configuration set;
    and
    determining a resource configuration with the best system performance KPI in the resource configuration set as the resource configuration of the cloud service system comprises
    determining a resource configuration, which has the best system performance KPI in the resource configuration set after the removal processing, to be the resource configuration of the cloud service system.

4. The method as claimed in claim 1, wherein the system simulation tool has visualized operation interfaces, the visualized operation interfaces comprise model display areas, and obtaining a model required for each service of the cloud service system from the model library comprises
    obtaining a selected model in response to a model selection operation on the model library in the model display areas.

5. The method as claimed in claim 1, wherein the system simulation tool has a visualized operation interface, the visualized operation interface comprises a model obtaining area, and obtaining a model required for each service of the cloud service system from the model library comprises
obtaining a model required for each service from the model library in response to inputting of service identification information or service configuration information of each service of the cloud service system in the model obtaining area.

6. The method as claimed in claim 4, wherein the visualized operation interfaces further comprise model editing areas, the method further comprises:
presenting each model obtained in the model editing areas;
and creating a service workflow among the obtained models to obtain a system simulation model of the cloud service system comprises
creating a service workflow among the models in response to a linking operation between corresponding endpoints of the obtained models in the model editing areas.

7. The method as claimed in claim 1, wherein creating a service workflow among the obtained models to obtain a system simulation model of the cloud service system comprises
creating a service workflow among the obtained models according to operation flow information of each service to obtain a system simulation model of the cloud service system.

8. The method as claimed in claim 1, wherein the mode library further comprises a service model set, the service model set comprises standard service workflow models, standard service performance models and/or standard cloud service performance models, and the method further comprises
obtaining a corresponding standard service workflow model, standard service performance model, and/or standard cloud service performance model from the service model set in response to comprising a standard service in each service of the cloud service system.

9. The method as claimed in claim 1, wherein the test data comprises verification data, and, before using the service performance model and the system simulation model to perform system simulation with a given resource configuration set to obtain a system performance KPI, the method further comprises
using the verification data to perform model verification;
wherein, when the model verification fails, the process of creating the system simulation model and the service performance model is executed again.

10. The method as claimed in claim 1, further comprising performing a performance test on the determined resource configuration.

11. An apparatus for determining a resource configuration of a cloud service system, wherein the apparatus is applied to a system simulation tool, the system simulation tool comprises a model library, the model library comprises a basic hardware model set, a cloud infrastructure model set and a basic software model set, the apparatus comprising:
a model obtaining unit configured to obtain a model required for each service of the cloud service system from the model library;
a resource limit setting obtaining unit configured to obtain a resource limit setting of each required model;
a service workflow creating unit configured to create a service workflow among the obtained models, to obtain a system simulation model of the cloud service system, wherein the service workflow indicates an interaction workflow among the models and a sequence of model execution in a single service;
a service performance model training unit configured to use training data to train a service performance model of each service in the system simulation model, wherein the training data comprises part or all of the test data collected from the cloud service system in a testing environment, and the service performance model defines a resource consumption of a single request running on a service in the system simulation model;
a system simulating unit configured to use the service performance models and the system simulation model to perform system simulation with a given resource configuration set and the resource limit settings, to obtain a system performance KPI; and
a resource configuration determining unit configured to determine a resource configuration with the best system performance KPI in the resource configuration set as the resource configuration of the cloud service system.

12. The apparatus as claimed in claim 11, further comprising:
a target performance KPI obtaining unit configured to obtain a target performance KPI of the system simulation model; and
a resource configuration removing unit configured to remove resource configurations, which have a system performance KPI exceeding the target performance KPI, from the resource configuration set;
wherein the resource configuration determining unit is configured to determine a resource configuration, which has the best system performance KPI in the resource configuration set after the removal processing, to be the resource configuration of the cloud service system.

13. The apparatus as claimed in claim 11, wherein the system simulation tool has visualized operation interfaces, the visualized operation interfaces comprise model display areas,
and the model obtaining unit is configured to obtain a selected model in response to a model selection operation on the model library in the model display areas.

14. The apparatus as claimed in claim 11, wherein the system simulation tool has a visualized operation interface, the visualized operation interface comprises a model obtaining area; and
the model obtaining unit is configured to obtain a model required for each service from the model library in response to inputting of service identification information or service configuration information of each service of the cloud service system in the model obtaining area.

15. The apparatus as claimed in claim 13, wherein the visualized operation interfaces further comprise model editing areas the apparatus further comprises:
a model presenting unit configured to present each model obtained in the model editing areas; and
the service workflow creating unit is configured to create a service workflow among the models in response to a linking operation between corresponding endpoints of the obtained models in the model editing areas.

16. The apparatus as claimed in claim 11, wherein the service workflow creating unit is configured to create a service workflow among the obtained models according to operation process information of each service.

17. The apparatus as claimed in claim 11, wherein the model library further comprises a service model set, the service model set comprises standard service workflow models, standard service performance models and/or standard cloud service performance models, and the model obtaining unit is further configured to obtain a corresponding standard service workflow model, standard service performance model and/or standard cloud service performance model from the service model set in response to a standard service being comprised in each service of the cloud service system.

18. The apparatus as claimed in claim 11, wherein the test data comprises verification data, and the apparatus further comprises
- a model verifying unit configured to use the verification data to perform model verification before system simulation is performed using the service performance models and the system simulation model with a given resource configuration set and the resource limit settings to obtain a system performance KPI,
- wherein when the model verification fails, the operations of the model obtaining unit, the resource limit setting obtaining unit, the service workflow creating unit, and the service performance model training unit are executed again.

19. A computing device comprising:
- a processor; and
- a memory coupled to the processor, configured to store an instruction, which, when executed by the processor, causes the processor to perform the method as claimed in claim 1.

* * * * *